United States Patent
Reilly et al.

(10) Patent No.: US 10,071,686 B2
(45) Date of Patent: Sep. 11, 2018

(54) ELECTRIC VEHICLE SOUND ENHANCEMENT SYSTEMS AND METHODS

(71) Applicant: GM Global Technology Operations LLC, Detroit, MI (US)

(72) Inventors: Scott M. Reilly, Southfield, MI (US); Frank C. Valeri, Novi, MI (US); Roger C. Barlow, Jr., Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 15/245,334

(22) Filed: Aug. 24, 2016

(65) Prior Publication Data
US 2018/0001818 A1 Jan. 4, 2018

Related U.S. Application Data

(60) Provisional application No. 62/356,768, filed on Jun. 30, 2016.

(51) Int. Cl.
| | |
|---|---|
| *H04B 1/00* | (2006.01) |
| *B60Q 9/00* | (2006.01) |
| *B60Q 5/00* | (2006.01) |
| *H04R 3/04* | (2006.01) |

(52) U.S. Cl.
CPC ............. *B60Q 9/00* (2013.01); *B60Q 5/005* (2013.01); *H04R 3/04* (2013.01); *H04R 2430/01* (2013.01); *H04R 2499/13* (2013.01)

(58) Field of Classification Search
CPC . B60Q 9/00; B60Q 5/005; H04R 3/04; H04R 2430/01; H04R 2499/13; H04R 5/02; B60R 11/0217; H04B 1/082; H03G 3/32

USPC .......................................................... 381/86
See application file for complete search history.

(56) References Cited

U.S. PATENT DOCUMENTS

| | | | |
|---|---|---|---|
| 4,551,849 | A | 11/1985 | Kasai et al. |
| 5,371,802 | A | 12/1994 | McDonald et al. |
| 8,155,343 | B2 | 4/2012 | Honji et al. |
| 8,320,581 | B2 | 11/2012 | Hera et al. |

(Continued)

FOREIGN PATENT DOCUMENTS

JP 10267745 10/1998

OTHER PUBLICATIONS

U.S. Appl. No. 14/851,627, dated Sep. 11, 2015, Barlow, Jr. et al.

(Continued)

*Primary Examiner* — Ahmad F Matar
*Assistant Examiner* — Sabrina Diaz

(57) ABSTRACT

An audio system of a vehicle includes: an acceleration state module that sets an acceleration state signal to a first state when a longitudinal acceleration of the vehicle is greater than a first predetermined acceleration, where the first predetermined acceleration is positive; a sound control module that selectively sets audio characteristics for an acceleration event in response to determinations that all of: (i) the acceleration state signal is in the first state; (ii) an electric motor is outputting positive torque to a powertrain of the vehicle; and (iii) a driver is applying pressure to an accelerator pedal; and an audio driver module that, based on the audio characteristics, applies power to speakers to output sound within a passenger cabin of the vehicle.

20 Claims, 4 Drawing Sheets

(56) References Cited

U.S. PATENT DOCUMENTS

| | | | |
|---|---|---|---|
| 8,473,154 B2* | 6/2013 | Noumura | B60W 10/04 |
| | | | 180/167 |
| 8,938,079 B2 | 1/2015 | Valeri et al. | |
| 9,031,248 B2 | 5/2015 | Hera | |
| 9,177,544 B2 | 11/2015 | Hera | |
| 9,227,566 B2 | 1/2016 | Valeri et al. | |
| 9,237,399 B2 | 1/2016 | Lagodziriski et al. | |
| 9,271,073 B2 | 2/2016 | Valeri et al. | |
| 9,299,337 B2 | 3/2016 | Hera et al. | |
| 9,311,910 B2 | 4/2016 | Hera | |
| 9,333,911 B2 | 5/2016 | Hera et al. | |
| 9,365,158 B2 | 6/2016 | Barlow, Jr. et al. | |
| 2003/0057015 A1 | 3/2003 | Helber et al. | |
| 2006/0208169 A1 | 9/2006 | Breed et al. | |
| 2012/0106748 A1* | 5/2012 | Peachey | B60Q 5/00 |
| | | | 381/61 |
| 2012/0134504 A1 | 5/2012 | Napoletano | |
| 2013/0177167 A1 | 7/2013 | Takahashi et al. | |
| 2014/0161276 A1 | 6/2014 | Klier | |
| 2015/0016627 A1 | 1/2015 | Barlow, Jr. et al. | |
| 2015/0127211 A1 | 5/2015 | Hobelsberger | |
| 2016/0016511 A1 | 1/2016 | Mueller | |
| 2016/0118950 A1 | 4/2016 | Mah | |
| 2016/0205472 A1 | 7/2016 | Violi et al. | |
| 2017/0043713 A1* | 2/2017 | Sun | B60Q 5/00 |

OTHER PUBLICATIONS

U.S. Appl. No. 15/161,991, dated May 23, 2016, Valeri.
U.S. Appl. No. 15/245,331, dated Aug. 24, 2016, Valeri et al.
U.S. Appl. No. 15/245,400, dated Aug. 24, 2016, Valeri et al.

* cited by examiner

ELECTRIC VEHICLE SOUND ENHANCEMENT SYSTEMS AND METHODS

CROSS-REFERENCE TO RELATED APPLICATIONS

This application claims the benefit of U.S. Provisional Application No. 62/356,768, filed on Jun. 30, 2016. The disclosure of the above application is incorporated herein by reference in its entirety.

The present disclosure is related to U.S. Pat. No. 8,938,079, issued on Jan. 20, 2015, U.S. Pat. No. 9,271,073, issued on Feb. 23, 2016, U.S. Pat. No. 9,365,158, issued on Jun. 14, 2016, U.S. patent application Ser. No. 14/851,627, filed on Sep. 11, 2015, U.S. patent application Ser. No. 15/161,991, filed on May 23, 2016, U.S. patent application Ser. No. 15/245,331, filed on Aug. 24, 2016, and U.S. patent application Ser. No. 15/245,400, filed on Aug. 24, 2016. The entire disclosures of the applications referenced above are incorporated herein by reference.

FIELD

The present disclosure relates to vehicle audio systems and methods and more particularly to audio control systems and methods in vehicles including both an internal combustion engine and one or more electric motors/motor generator units.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some motor vehicles include conventional powertrains having an internal combustion engine and a drivetrain that normally emit sounds during acceleration events, deceleration events, and gear changes. Many consumers have come to rely on these normal sounds as a sign of proper vehicle function. Changes in these normal sounds may indicate, to certain consumers, that the internal combustion engine and/or the drivetrain may be functioning differently than expected.

Some consumers may have expectations as to what the normal sounds of different types of vehicle should be. For example, a consumer may expect certain sounds from "high performance" vehicles, while some sounds may not be expected from other types of vehicles. An absence of expected sounds may detract from a user's enjoyment of a vehicle.

Some motor vehicles include hybrid electric powertrains including an internal combustion engine and one or more electric motors and/or motor generator units (MGUs). Sound produced by hybrid electric powertrains may be different than the sound produced by conventional powertrains.

SUMMARY

In a feature, an audio system of a vehicle includes: an acceleration state module that sets an acceleration state signal to a first state when a longitudinal acceleration of the vehicle is greater than a first predetermined acceleration, where the first predetermined acceleration is positive; a sound control module that selectively sets audio characteristics for an acceleration event in response to determinations that all of: (i) the acceleration state signal is in the first state; (ii) an electric motor is outputting positive torque to a powertrain of the vehicle; and (iii) a driver is applying pressure to an accelerator pedal; and an audio driver module that, based on the audio characteristics, applies power to speakers to output sound within a passenger cabin of the vehicle.

In further features, the sound control module sets the audio characteristics for the acceleration event in response to determinations that all of: (i) the acceleration state signal is in the first state; (ii) the electric motor is outputting positive torque to the powertrain of the vehicle; (iii) the driver is applying pressure to the accelerator pedal; (iv) a rate of change of an engine speed of an internal combustion engine of the vehicle is greater than a predetermined rate of change of the engine speed; and (v) a present gear ratio of a transmission of the vehicle is greater or equal to a predetermined gear ratio.

In further features, the sound control module sets the audio characteristics for the acceleration event in response to determinations that all of: (i) the acceleration state signal is in the first state; (ii) the electric motor is outputting positive torque to the powertrain of the vehicle; (iii) the driver is applying pressure to the accelerator pedal; (iv) the longitudinal acceleration of the vehicle is greater than a second predetermined acceleration, where the second predetermined acceleration is positive and is greater than the first predetermined acceleration; and (v) a present gear ratio of a transmission of the vehicle is greater or equal to a predetermined gear ratio.

In further features, the sound control module sets the audio characteristics for the acceleration event in response to determinations that all of: (i) the acceleration state signal is in the first state; (ii) the electric motor is outputting positive torque to the powertrain of the vehicle; (iii) the driver is applying pressure to the accelerator pedal; (iv) a latitudinal acceleration of the vehicle is greater than a predetermined latitudinal acceleration; and (v) a present gear ratio of a transmission of the vehicle is less than a predetermined gear ratio.

In further features, the sound control module sets the audio characteristics for the acceleration event based on a present torque output of the electric motor.

In further features, the audio characteristics include a loudness, the sound control module increases the loudness for the acceleration event as the present torque output of the electric motor increases, and the sound control module decreases the loudness for the acceleration event as the present torque output of the electric motor decreases.

In further features, the sound control module sets the audio characteristics for the acceleration event based on a pseudo engine speed.

In further features, the audio characteristics include a frequency for outputting predetermined sounds, the sound control module increases the frequency for the acceleration event as the pseudo engine speed increases, and the sound control module decreases the frequency for the acceleration event as the pseudo engine speed decreases.

In further features, the sound control module further selectively sets second audio characteristics for a regeneration event in response to determinations that both of: (i) the longitudinal acceleration of the vehicle is negative; and (ii) the electric motor is converting mechanical energy of the powertrain of the vehicle into electrical energy; and the audio driver module further, based on the second audio characteristics, applies power to the speakers to output sound within the passenger cabin of the vehicle.

In further features, the second audio characteristics include a loudness, the sound control module sets the loudness of sound output for the regeneration event based on at least one of (i) the longitudinal acceleration of the vehicle, (ii) whether the driver is applying pressure to a brake pedal, (iii) whether the driver is actuating a regeneration user input device, and (iv) a negative torque output of the electric motor.

In a feature, a vehicle audio system includes: at least one memory comprising computer executable instructions; and at least one processor configured to read and execute the computer executable instructions, the computer executable instructions causing the at least one processor to: set an acceleration state signal to a first state when a longitudinal acceleration of the vehicle is greater than a first predetermined acceleration, where the first predetermined acceleration is positive; set audio characteristics for an acceleration event in response to determinations that all of: (i) the acceleration state signal is in the first state; (ii) an electric motor is outputting positive torque to a powertrain of the vehicle; and (iii) a driver is applying pressure to an accelerator pedal; and, based on the audio characteristics, apply power to speakers to output sound within a passenger cabin of the vehicle.

In further features, the computer executable instructions further cause the at least one processor to set the audio characteristics for the acceleration event based on a present torque output of the electric motor.

In further features, the audio characteristics include a loudness, and the computer readable instructions further cause the at least one processor to: (i) increase the loudness for the acceleration event as the present torque output of the electric motor increases; and (ii) decrease the loudness for the acceleration event as the present torque output of the electric motor decreases.

In further features, the computer executable instructions further cause the at least one processor to set the audio characteristics for the acceleration event based on a pseudo engine speed.

In further features, the audio characteristics include a frequency for outputting predetermined sounds, and the computer executable instructions further cause the at least one processor to: increase the frequency for the acceleration event as the pseudo engine speed increases; and decrease the frequency for the acceleration event as the pseudo engine speed decreases.

In further features, the computer executable instructions further cause the at least one processor to: set second audio characteristics for a regeneration event in response to determinations that both of: (i) the longitudinal acceleration of the vehicle is negative; and (ii) the electric motor is converting mechanical energy of the powertrain of the vehicle into electrical energy; and, based on the second audio characteristics, apply power to the speakers to output sound within the passenger cabin of the vehicle.

In further features, the second audio characteristics include a loudness, and the computer executable instructions further cause the at least one processor to set the loudness of sound output for the regeneration event based on at least one of (i) the longitudinal acceleration of the vehicle, (ii) whether the driver is applying pressure to a brake pedal, (iii) whether the driver is actuating a regeneration user input device, and (iv) a negative torque output of the electric motor.

In further features, a non-transitory computer readable medium includes computer executable instructions, the computer executable instructions configured to cause a processor to perform a method, the method comprising: setting an acceleration state signal to a first state when a longitudinal acceleration of the vehicle is greater than a first predetermined acceleration, where the first predetermined acceleration is positive; setting audio characteristics for an acceleration event in response to determinations that all of: (i) the acceleration state signal is in the first state; (ii) an electric motor is outputting positive torque to a powertrain of the vehicle; and (iii) a driver is applying pressure to an accelerator pedal; and, based on the audio characteristics, applying power to speakers to output sound within a passenger cabin of the vehicle.

In further features, the method further comprises at least one of (A) and (B): (A) setting the audio characteristics for the acceleration event based on a present torque output of the electric motor including: (i) increasing the loudness for the acceleration event as the present torque output of the electric motor increases; and (ii) decreasing the loudness for the acceleration event as the present torque output of the electric motor decreases; and (B) setting the audio characteristics for the acceleration event based on a pseudo engine speed including: (i) increasing the frequency for the acceleration event as the pseudo engine speed increases; and (ii) decreasing the frequency for the acceleration event as the pseudo engine speed decreases.

In further features, the method further comprises: setting second audio characteristics for a regeneration event in response to determinations that both of: (i) the longitudinal acceleration of the vehicle is negative; and (ii) the electric motor is converting mechanical energy of the powertrain of the vehicle into electrical energy; and, based on the second audio characteristics, applying power to the speakers to output sound within the passenger cabin of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines of vehicles combust air and fuel within cylinders. A vehicle also includes one or more motor generator units (MGUs) that can be used to perform different functions at different times. For example, an MGU can be used (i) to output torque to a powertrain of the vehicle and (ii) to impose a load on the powertrain of the vehicle to convert mechanical energy into electrical energy, for example, for regeneration.

A control module of the vehicle may control a MGU to output torque to the powertrain during vehicle acceleration to provide additional vehicle acceleration relative to use of only the internal combustion engine. A control module may also control the MGU to perform regeneration during vehicle deceleration.

According to the present disclosure, an audio control module of the vehicle outputs sound within a passenger cabin of the vehicle via one or more speakers when the MGU is being controlled to provide additional vehicle acceleration during vehicle acceleration. The audio control module also outputs sound within the passenger cabin via the one or more speakers when the MGU is being controlled to perform regeneration during vehicle deceleration. These sounds may audibly inform the driver as to use of the MGU for acceleration and to the use of the MGU for regeneration. In other words, these sounds provide aural feedback that may help a driver drive the vehicle. Specifically, the sound may correspond to the torque output and acceleration or deceleration provided by the MGU. In the acceleration case, the sound may help make the driver aware that more power is being applied to the wheels.

Figure 1:
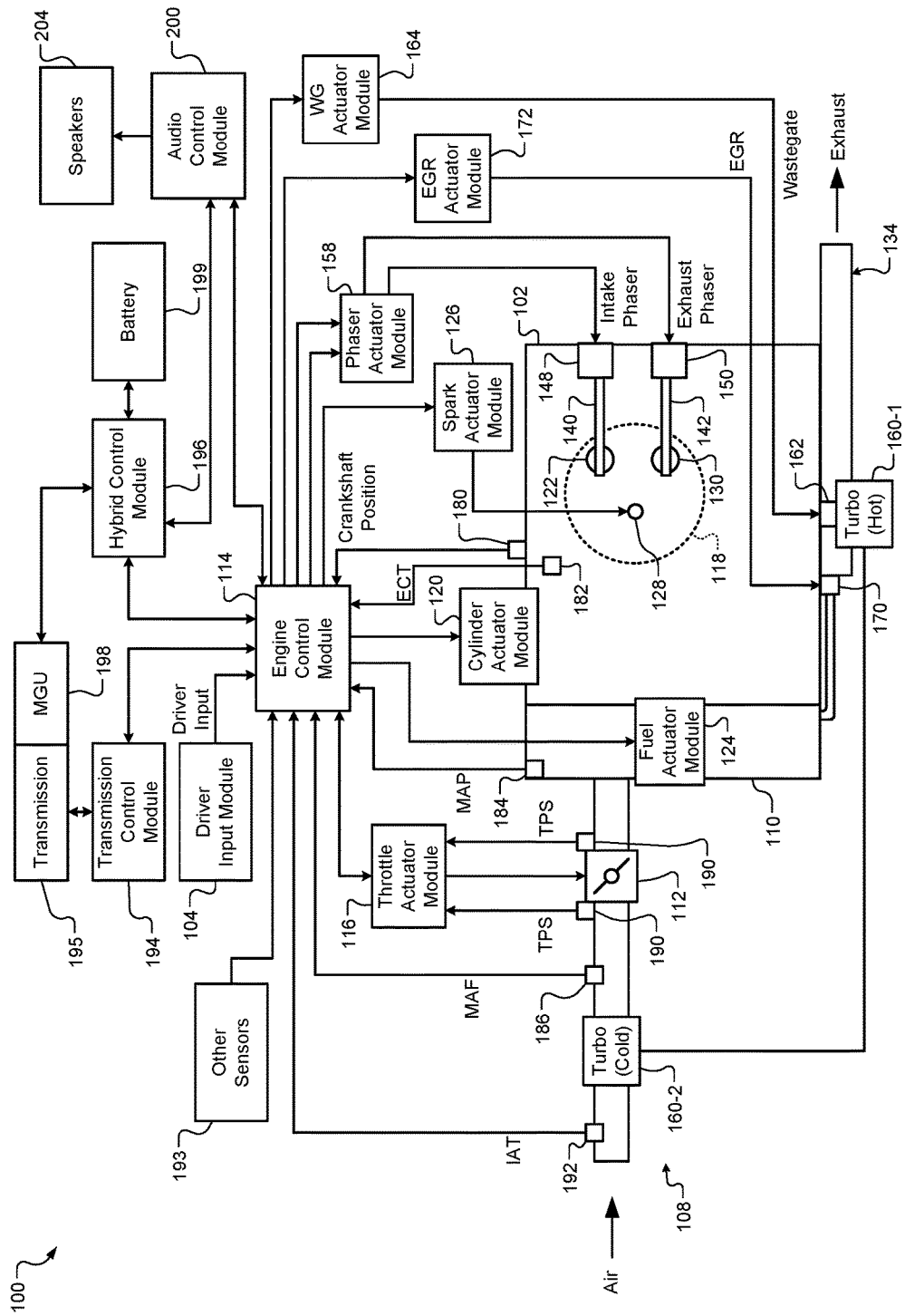
FIG. 1 is a functional block diagram of an example engine system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and a motor generator unit (MGU) 198. While the example of one MGU is provided, multiple MGUs and/or electric motors may be implemented. The terms MGU and electric motor may be interchangeable in the context of the present application, drawings, and claims. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the MGU 198 to output torque, for example, to supplement engine torque output. For example, the hybrid control module 196 may control the MGU 198 to output (positive) torque when the torque request is greater than a predetermined torque, when the APP is greater than a predetermined position, or when the driver is rapidly depressing the accelerator pedal. The predetermined torque may be calibrated and may be, for example, at least a predetermined fraction of a maximum possible torque output of the engine 102 under the present operating conditions. The predetermined fraction may be calibratable, is greater than zero, and may be, for example, approximately 80 percent, approximately 90 percent, or another suitable value that is greater than 50 percent of the maximum possible torque output of the engine 102.

The hybrid control module 196 applies electrical power from a battery 199 to the MGU 198 to cause the MGU 198 to output positive torque. While the example of the battery 199 is provided, more than one battery may be used to supply power to the MGU 198. The MGU 198 may output torque, for example, to the engine 102, to an input shaft of the transmission 195, to an output shaft of the transmission 195, or to another torque transfer device of the powertrain of the vehicle. The battery 199 may be dedicated for the MGU 198 and one or more other batteries may supply power for other vehicle functions.

Under other circumstances, the hybrid control module 196 may control the MGU 198 to convert mechanical energy of the vehicle into electrical energy. The hybrid control module 196 may control the MGU 198 to convert mechanical energy into electrical energy, for example, to recharge the battery 199. This may be referred to as regeneration.

The vehicle also includes an audio control module 200 that controls sound output via speakers 204 within the passenger cabin of the vehicle. The audio control module 200 may control the speakers 204 to output sound based on received amplitude modulation (AM) signals, received frequency modulation (FM) signals, received satellite signals, and other types of audio signals. The audio control module 200 may be implemented, for example, with an infotainment system.

Under some circumstances, the audio control module 200 additionally or alternatively controls the sound output via the speakers 204 based on operation of the MGU 198. For example, as discussed further below, the audio control module 200 may control the sound output via the speakers 204 to audibly indicate to the driver of the use of the MGU 198 for vehicle acceleration. Additionally or alternatively, the audio control module 200 may control the sound output via the speakers 204 to audibly indicate to the driver of the use of the MGU 198 for regeneration.

The audio control module 200 may receive parameters from the ECM 114, the hybrid control module 196, the transmission control module 194, and/or one or more other control modules of the vehicle. The audio control module 200 may receive parameters from other modules, for example, via a car area network (CAN) bus. As discussed further below, the audio control module 200 may determine when and the extent to which to output sound for operation of the MGU 198 based on one or more of the received parameters.

Figure 2:
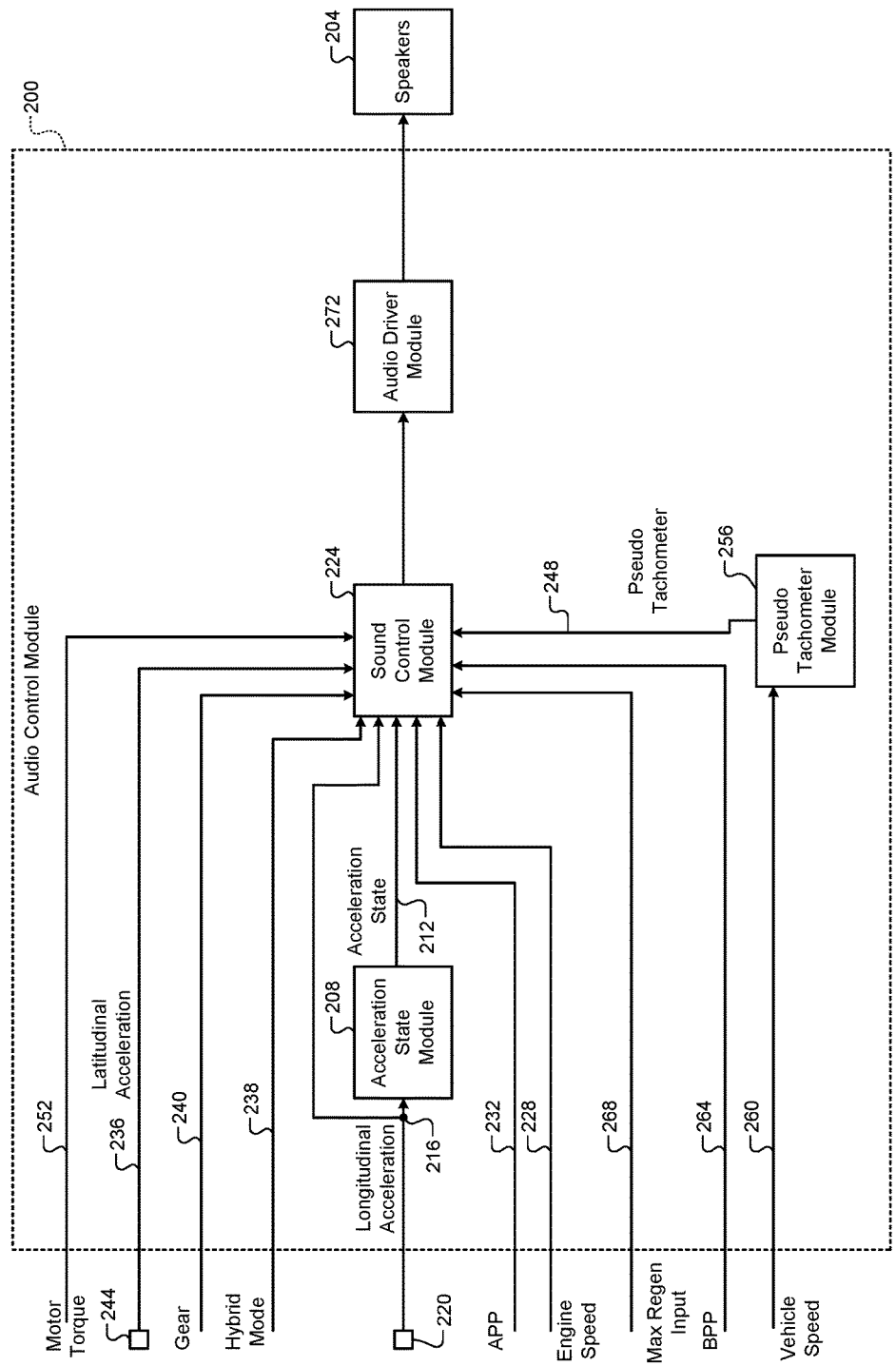
FIG. 2 is a functional block diagram of an example audio system including an audio control module and speakers.

FIG. 2 is a functional block diagram of an example audio system including the audio control module 200 and the speakers 204. The speakers 204 output sound within the passenger cabin of the vehicle.

An acceleration state module 208 determines an acceleration state 212 of the vehicle. For example only, the acceleration state module 208 may set the acceleration state 212 to an accelerating state (a first state) when a longitudinal (e.g., fore/aft) acceleration 216 of the vehicle is greater than a first predetermined acceleration. The first predetermined acceleration is a positive value. The first predetermined acceleration is calibratable and may be, for example, approximately 0.2 g or another suitable positive acceleration.

The acceleration state module 208 may set the acceleration state 212 to a decelerating state (a second state) when the longitudinal acceleration 216 of the vehicle is less than (i.e., more negative than) a second predetermined acceleration. The second predetermined acceleration is a negative value. The second predetermined acceleration is calibratable and may be, for example, approximately −0.2 g or another suitable negative acceleration. The longitudinal acceleration 216 of the vehicle may be measured using one or more longitudinal acceleration sensors, such as longitudinal acceleration sensor 220.

When the MGU 198 is in use, either to output torque for vehicle propulsion or imposing negative torque for regeneration, a sound control module 224 determines whether and what sound to output via the speakers 204 based on the acceleration state 212 and one or more other parameters. For example, when the acceleration state 212 is in the accelerating state, the sound control module 224 may determine whether to output an accelerating sound based on an engine speed 228, the longitudinal acceleration 216, an APP 232, and/or a latitudinal acceleration 236 of the vehicle.

A hybrid mode signal 238 may indicate whether the MGU 198 is in use. For example, the hybrid control module 196 may set the hybrid mode signal 238 to a first state when the MGU 198 is presently being used to generate propulsion torque or to convert mechanical power into electrical power, for example, for regeneration of the battery 199. The hybrid control module 196 may set the hybrid mode signal 238 to a second state when the MGU 198 is not being used to generate propulsion torque and is not being used to convert mechanical power into electrical power.

When a present gear ratio 240 engaged within the transmission 195 is greater than or equal to a predetermined gear ratio, the sound control module 224 may determine to output an acceleration sound when the APP 232 is greater than a first predetermined APP and at least one of: (i) a rate of change in the engine speed 228 is greater than a predetermined engine speed rate of change; and (ii) the longitudinal acceleration 216 is greater than a third predetermined acceleration.

The predetermined gear ratio is calibratable and may be, for example, a gear ratio corresponding to a 5th gear of the transmission 195 or another suitable gear ratio of the transmission 195. The present gear ratio 240 may be provided by the transmission control module 194 or determined based on one or more parameters, such as based on a ratio of a transmission input shaft speed to a transmission output shaft speed. The predetermined engine speed rate of change is a positive value. The engine speed 228 may be determined, for example, based on the crankshaft position measured using the crankshaft position sensor 180. In various implementations, the engine speed 228 may be determined and provided by the ECM 114. The third predetermined acceleration is positive and may be less than, the same as, or greater than the first predetermined acceleration.

The APP 232 may be measured using an APP sensor and may have a range between 0 and 100 percent. An APP of 0 percent may correspond to a steady-state position where the accelerator pedal rests when the driver is not applying pressure to the accelerator pedal. An APP of 100 percent may correspond to a position where the driver has actuated the accelerator pedal to a predetermined maximum extent. Using the above example range between 0 and 100 percent, the first predetermined APP is positive, is greater than 50 percent, and may be, for example, approximately 70 percent, approximately 80 percent, approximately 90 percent, or another suitable APP.

When the present gear ratio 240 engaged within the transmission 195 is less than the predetermined gear ratio, the sound control module 224 may determine to output acceleration sound when the APP 232 is greater than a second predetermined APP and the latitudinal acceleration 236 of the vehicle is greater than a predetermined latitudinal acceleration. The second predetermined APP is positive and may be the same as, less than, or greater than the first predetermined APP. The latitudinal acceleration 236 may be measured using one or more latitudinal acceleration sensors 236 of the vehicle, such as latitudinal acceleration sensor 244.

One or more predetermined sounds may be used to create the acceleration sound. When the sound control module 224 determines to output the acceleration sound, the sound control module 224 determines characteristics of the acceleration sound, for example, based on a pseudo tachometer signal 248, a present torque output 252 of the MGU 198, and/or one or more other parameters. The sound control module 224 may set a loudness for the acceleration sound based on the present torque output 252 of the MGU 198. For example, the sound control module 224 may increase the loudness of the acceleration sound as the present torque output 252 of the MGU 198 increases and vice versa. The present torque output 252 of the MGU 198 may be measured or determined in various implementations. The present torque output 252 may be provided by the hybrid control module 196. In various implementations, a present rotational speed of the MGU 198, a voltage applied to the MGU 198, a current to the MGU 198, and/or one or more other parameters may be used additionally or alternatively to the present torque output 252 of the MGU 198. Loudness may include harmonics (or orders) of the predetermined sound(s) and/or magnitude of individual harmonics. Loudness may increase as the number of harmonics increases and/or the magnitude of one or more harmonics increases. Loudness may decrease as the number of harmonics decreases and/or the magnitude of one or more harmonics decreases.

The sound control module 224 may set a frequency for outputting the predetermined sounds used to create the acceleration sound based on the pseudo tachometer signal 248. For example, the sound control module 224 may increase the frequency as the pseudo tachometer signal 248 increases and vice versa.

A pseudo tachometer module 256 generates the pseudo tachometer signal 248. The pseudo tachometer signal 248 (e.g., in RPM, revolutions per minute) may correspond to an engine speed that the engine 102 would operate to achieve the present operating conditions including a vehicle speed 260 and the present gear ratio 240 without the torque output from the MGU 198. The vehicle speed 260 may be determined based on one or more wheel speeds of the vehicle measured using wheel speed sensor(s), respectively. The pseudo tachometer module 256 may generate the pseudo tachometer signal 248, for example, using one or more functions or lookup tables that relate vehicle speeds, gear ratios, and/or one or more other operating parameters to pseudo tachometer (RPM) signals. Generally speaking, at a given gear ratio, the pseudo tachometer module 256 may increase the pseudo tachometer signal 248 (in RPM) as the vehicle speed 260 increases and vice versa. Further details regarding the pseudo tachometer signal 248 can be found, for example, in commonly assigned U.S. Pat. No. 9,227,566, titled "Pseudo-Tach Signal System for A Motor Vehicle," which is incorporated herein in its entirety.

When the acceleration state 212 is set to the decelerating state, the sound control module 224 determines whether and how to output a regeneration sound via the speakers 204. The sound control module 224 may determine whether to output the regeneration sound and characteristics of the regeneration sound based on the longitudinal acceleration 216, a BPP 264, and a maximum regeneration input signal 268. The BPP 264 may be measured using a BPP sensor.

The maximum regeneration input signal 268 indicates whether the driver has actuated a maximum regeneration driver input device (e.g., a paddle). For example, the hybrid control module 196 may set the maximum regeneration input signal 268 to a first state when the driver has actuated the maximum regeneration driver input device. Conversely, the hybrid control module 196 may set the maximum regeneration input signal 268 to a second state when the driver has not actuated the maximum regeneration driver input device.

One or more predetermined sounds may be used to generate the regeneration sound. The sound control module 224 may set a loudness for the regeneration sound based on the longitudinal acceleration 216, the BPP 264, the maximum regeneration input signal 268, and/or the present torque output 252 of the MGU 198. During regeneration, the present torque output 252 of the MGU 252 is negative. As discussed above, loudness may include harmonics (or orders) of the predetermined sound(s) and/or magnitude of individual harmonics. Loudness may increase as the number of harmonics increases and/or the magnitude of one or more harmonics increases. Loudness may decrease as the number of harmonics decreases and/or the magnitude of one or more harmonics decreases.

For example, when the longitudinal acceleration 216 is greater than a fourth predetermined acceleration, the sound control module 224 may set a loudness of the regeneration sound to a first predetermined loudness. The fourth predetermined acceleration is negative and may be more negative (further from 0) than the second predetermined acceleration or less negative (closer to 0) than the second predetermined acceleration.

When the longitudinal acceleration 216 is less than (i.e., more negative than) the fourth predetermined acceleration, the sound control module 224 may set the loudness of the regeneration sound to a second predetermined loudness when the maximum regeneration input signal 268 is in the second state. When the longitudinal acceleration 216 is less than the fourth predetermined acceleration and the maximum regeneration input signal 268 is in the first state, the sound control module 224 may set the loudness of the regeneration sound to a third predetermined loudness when the BPP 264 indicates that the driver has actuated the brake pedal. When the longitudinal acceleration 216 is less than the fourth predetermined acceleration, the maximum regeneration input signal 268 is in the first state, and the BPP 264 indicates that the driver has not actuated the brake pedal, the sound control module 224 may set the loudness of the regeneration sound to a fourth predetermined loudness. The fourth predetermined loudness may be greater than the third predetermined loudness, the third predetermined loudness may be greater than the second predetermined loudness, and the second predetermined loudness may be greater than the first predetermined loudness. Given the relationships between the first second, third, and fourth predetermined loudnesses, the loudness of the regeneration sound may increase as the amount of regeneration achieved by the MGU 198 increases and vice versa.

When not outputting the acceleration sound or the regeneration sound, the sound control module 224 may set sound to be output via the speakers 204 based on operation in a normal engine sound enhancement (ESE) mode. An audio driver module 272 applies power (e.g., from the one or more other batteries) to the speakers 204 to output sound (e.g., the acceleration sound, the regeneration sound) as specified by the sound control module 224.

Figure 3A:
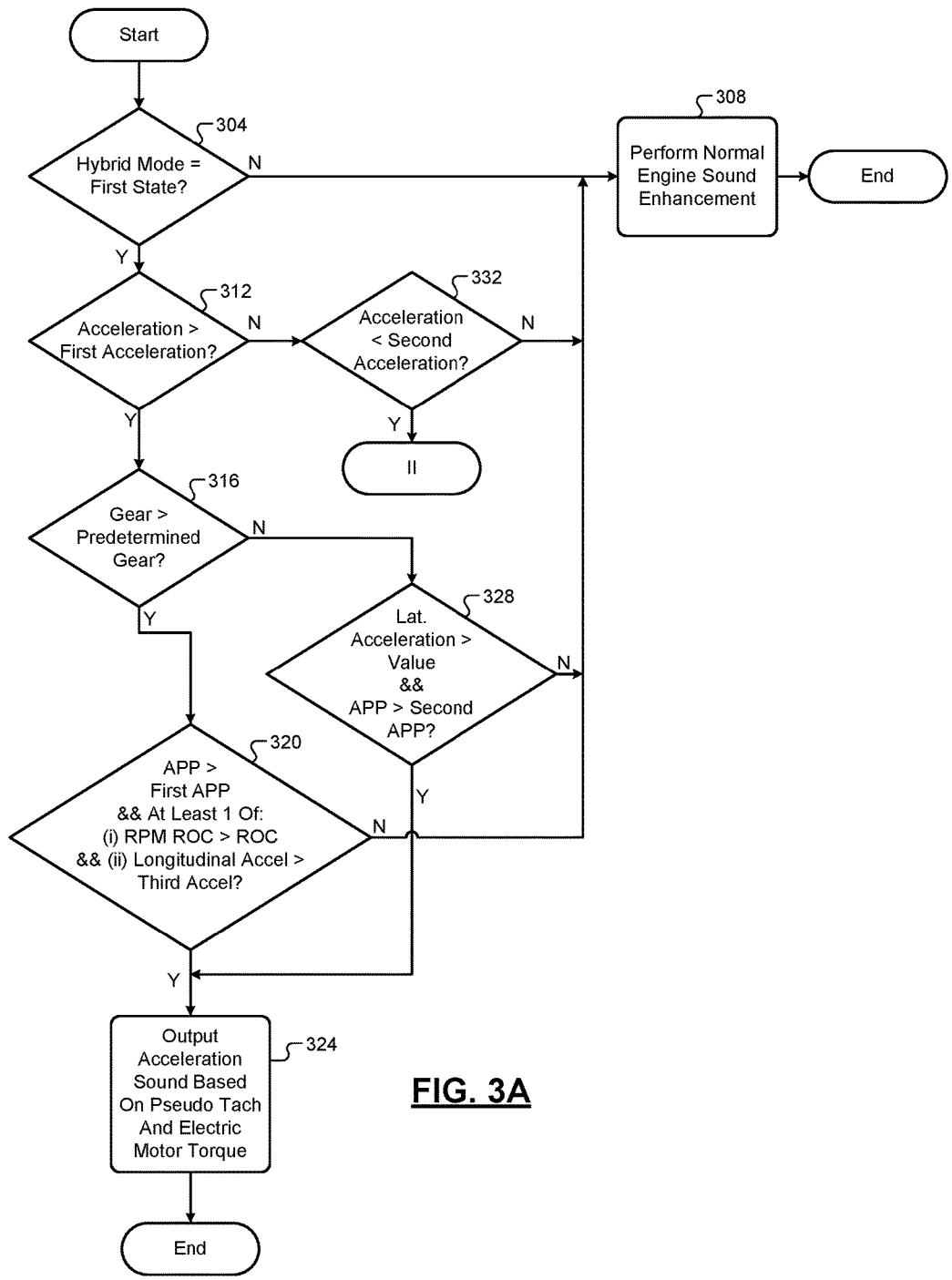
FIGS. 3A-3B are a flowchart depicting an example method of generating sound during use of a motor for acceleration and during use of a motor for regeneration.
Figure 3B:
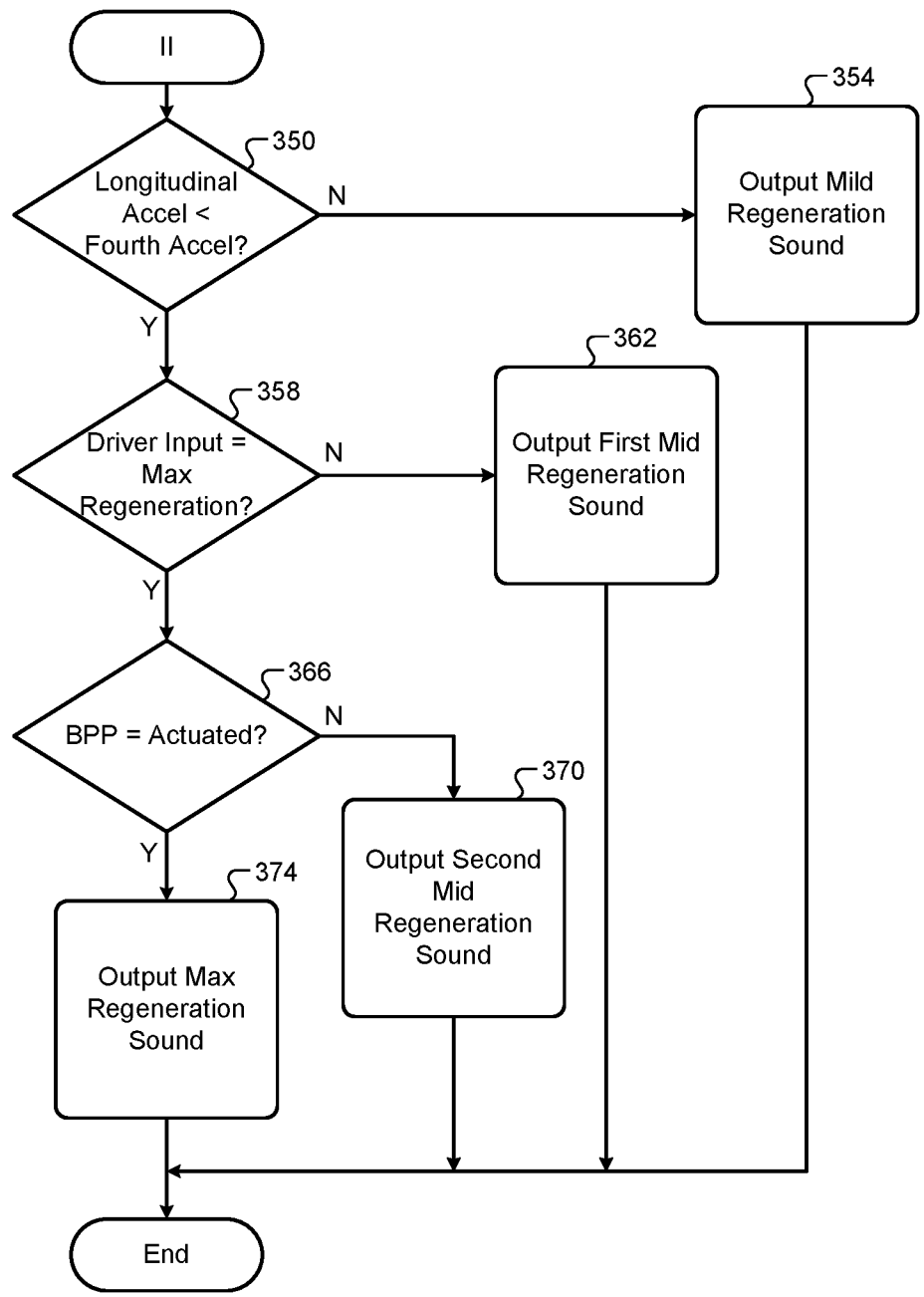

FIGS. 3A and 3B are collectively a flowchart depicting an example method of selectively outputting sound (e.g., an acceleration sound or a regeneration sound) based on present operating conditions. Referring to FIG. 3A, control begins with 304 where the sound control module 224 determines whether the hybrid mode signal 238 is set to the first mode. When the hybrid mode signal 238 is in the first mode, the MGU 198 is being used either to output torque or for regeneration. If 304 is false, the sound control module 224 may perform normal ESE mode operation at 308, and control may end. If 304 is true, control may continue with 312.

At 312, the acceleration state module 208 may determine whether the longitudinal acceleration 216 of the vehicle is greater than the first predetermined acceleration. The first predetermined acceleration is positive, as discussed above. If 312 is true, the acceleration state module 208 sets the acceleration state 212 to the first state, and control continues with 316. If 312 is false, control transfers to 332, which is discussed further below.

At 316 (when the acceleration state 212 is in the first state), the sound control module 224 may determine whether the present gear ratio 240 of the transmission 195 is greater than or equal to a predetermined gear. If 316 is true, control continues with 320. If 316 is false, control transfers to 328, which is discussed further below. The predetermined gear ratio may correspond to, for example, a 5th gear ratio.

At 320, the sound control module 320 determines whether the APP 232 is greater than the first predetermined APP and at least one of: (i) a rate of change of the engine speed 228 is greater than the predetermined rate of change; and (ii) the longitudinal acceleration 216 of the vehicle is greater than the third predetermined acceleration. If 320 is true, the sound control module 224 determines to output the acceleration sound and continues with 324. At 324, the sound control module 224 sets characteristics of the acceleration sound, for example, based on the pseudo tachometer signal 248, the present torque output 252 of the MGU 198, and/or one or more other present operating conditions. For example, the sound control module 224 may set a frequency of the acceleration sound based on the pseudo tachometer signal 248 and may set a loudness of the acceleration sound based on the present torque output 252 of the MGU 198. Also at 324, the audio driver module 272 applies power to the speakers 204 to audibly output the acceleration sound as set by the sound control module 224. If 320 is false, the sound control module 224 determines not to output the acceleration sound, and control transfers to 308, as discussed above. While the example of the use of the APP 232 being greater than the first predetermined APP is provided, the present application is also applicable to autonomous vehicles. In autonomous vehicles, a torque request being greater than a predetermined torque may be used in place of the APP 232 being greater than the first predetermined APP.

Referring back to 328 (when the present gear ratio 240 of the transmission 195 is less than the predetermined gear ratio), the sound control module 224 determines whether the latitudinal acceleration 236 of the vehicle is greater than the predetermined latitudinal acceleration and the APP 232 is greater than the second predetermined APP. If 328 is true, the sound control module 224 determines to output a second acceleration sound and continues with 324. The second acceleration sound may be the same or different than the acceleration sound discussed above. As discussed above, at 324, the characteristics of the second acceleration sound are set and the second acceleration sound is output via the speakers 204. If 328 is false, the sound control module 224 determines not to output an acceleration sound, and control transfers to 308, as discussed above.

Referring back to 332, when the longitudinal acceleration 216 of the vehicle is less than the first predetermined acceleration, the acceleration state module 208 may determine whether the longitudinal acceleration 216 of the vehicle is less than the second predetermined acceleration. The second predetermined acceleration is negative (i.e., indicative of deceleration), as discussed above. If 332 is true, control continues with 350 of FIG. 3B. If 332 is false, the sound control module 224 determines not to output the acceleration sound, and control transfers to 308, as discussed above.

Referring now to FIG. 3B, at 350 the sound control module 224 may determine whether the longitudinal acceleration 216 of the vehicle is less than the fourth predetermined acceleration. As discussed above, the fourth predetermined acceleration is negative (i.e., indicative of deceleration). If 350 is false (i.e., the longitudinal acceleration is less negative and therefore closer to zero than the fourth predetermined acceleration), control continues with 354. At 354, the sound control module 224 sets a loudness of the regeneration sound to the first predetermined loudness, and the audio driver module 272 outputs the regeneration sound via the speakers 204. If 350 is true, control continues with 358.

At 358, the sound control module 224 determines whether the maximum regeneration input signal 268 is in the first state. The maximum regeneration input signal 268 being in the first state indicates that the driver is presently actuating the maximum regeneration driver input device. The maximum regeneration input signal 268 being in the second state indicates that the driver is not presently actuating the maximum regeneration driver input device. If 358 is false (the driver is not presently actuating the maximum regeneration driver input device), control continues with 362. At 362, the sound control module 224 sets a loudness of the regeneration sound to the second predetermined loudness, and the audio driver module 272 outputs the regeneration sound via the speakers 204. If 358 is true, control continues with 366.

At 366, the sound control module 224 determines whether the driver is presently applying the brake pedal, such as based on the BPP 264. If 366 is false, control continues with 370. At 370, the sound control module 224 sets a loudness of the regeneration sound to the third predetermined loudness, and the audio driver module 272 outputs the regeneration sound via the speakers 204. If 366 is true, the sound control module 224 sets a loudness of the regeneration sound to the fourth predetermined loudness, and the audio driver module 272 outputs the regeneration sound via the speakers 204 at 374. The fourth predetermined loudness may be greater than the third predetermined loudness, the third predetermined loudness may be greater than the second predetermined loudness, and the second predetermined loudness may be greater than the first predetermined loudness. As such, the sound control module 224 may increase the loudness of the regeneration sound as the amount of regeneration achieved by the MGU 198 increases and vice versa. While the example of FIGS. 3A and 3B illustrates one control loop, control may return to 304.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An audio system of a vehicle, comprising:
   an acceleration state module that sets an acceleration state signal to a first state when a longitudinal acceleration of the vehicle is greater than a first predetermined acceleration,
   wherein the first predetermined acceleration is positive;

a sound control module that selectively sets audio characteristics for an acceleration event in response to determinations that all of:
(i) the acceleration state signal is in the first state;
(ii) an electric motor is outputting positive torque to a powertrain of the vehicle;
(iii) an accelerator pedal position (APP) is greater than a predetermined APP,
wherein the predetermined APP is at least 50 percent of a predetermined maximum APP;
(iv) a selected gear ratio of a transmission of the vehicle is greater than or equal to a predetermined gear ratio,
wherein the predetermined gear ratio is at least a fifth gear ratio of the transmission; and
an audio driver module that, based on the audio characteristics, applies power to speakers to output sound within a passenger cabin of the vehicle.

2. The audio system of claim 1 wherein the sound control module sets the audio characteristics for the acceleration event in response to determinations that all of:
(i) the acceleration state signal is in the first state;
(ii) the electric motor is outputting positive torque to the powertrain of the vehicle;
(iii) the APP is greater than the predetermined APP;
(iv) the selected gear ratio of the transmission of the vehicle is greater than or equal to the predetermined gear ratio; and
(v) a rate of change of an engine speed of an internal combustion engine of the vehicle is greater than a predetermined rate of change of the engine speed.

3. The audio system of claim 1 wherein the sound control module sets the audio characteristics for the acceleration event in response to determinations that all of:
(i) the acceleration state signal is in the first state;
(ii) the electric motor is outputting positive torque to the powertrain of the vehicle;
(iii) the APP is greater than the predetermined APP;
(iv) the selected gear ratio of the transmission of the vehicle is greater than or equal to the predetermined gear ratio; and
(v) the longitudinal acceleration of the vehicle is greater than a second predetermined acceleration,
wherein the second predetermined acceleration is positive and is greater than the first predetermined acceleration.

4. The audio system of claim 1 wherein the sound control module sets the audio characteristics for the acceleration event in response to determinations that all of:
(i) the acceleration state signal is in the first state;
(ii) the electric motor is outputting positive torque to the powertrain of the vehicle;
(iii) the APP is greater than the predetermined APP;
(iv) the selected gear ratio of the transmission of the vehicle is greater than or equal to the predetermined gear ratio; and
(v) a latitudinal acceleration of the vehicle is greater than a predetermined latitudinal acceleration.

5. The audio system of claim 1 wherein the sound control module sets the audio characteristics for the acceleration event based on a present torque output of the electric motor.

6. The audio system of claim 5 wherein:
the audio characteristics include a loudness;
the sound control module increases the loudness for the acceleration event as the present torque output of the electric motor increases; and
the sound control module decreases the loudness for the acceleration event as the present torque output of the electric motor decreases.

7. The audio system of claim 1 wherein the sound control module sets the audio characteristics for the acceleration event based on a pseudo engine speed.

8. The audio system of claim 7 wherein:
the audio characteristics include a frequency for outputting predetermined sounds;
the sound control module increases the frequency for the acceleration event as the pseudo engine speed increases; and
the sound control module decreases the frequency for the acceleration event as the pseudo engine speed decreases.

9. The audio system of claim 1 wherein:
the sound control module further selectively sets second audio characteristics for a regeneration event in response to determinations that both of:
(i) the longitudinal acceleration of the vehicle is negative; and
(ii) the electric motor is converting mechanical energy of the powertrain of the vehicle into electrical energy; and
wherein the audio driver module further, based on the second audio characteristics, applies power to the speakers to output sound within the passenger cabin of the vehicle.

10. The audio system of claim 9 wherein:
the second audio characteristics include a loudness; and
the sound control module sets the loudness of sound output for the regeneration event based on at least one of (i) the longitudinal acceleration of the vehicle, (ii) whether the driver is applying pressure to a brake pedal, (iii) whether the driver is actuating a regeneration user input device, and (iv) a negative torque output of the electric motor.

11. A vehicle audio system, comprising:
at least one memory comprising computer executable instructions;
at least one processor configured to read and execute the computer executable instructions, the computer executable instructions causing the at least one processor to:
set an acceleration state signal to a first state when a longitudinal acceleration of the vehicle is greater than a first predetermined acceleration,
wherein the first predetermined acceleration is positive;
set audio characteristics for an acceleration event in response to determinations that all of:
(i) the acceleration state signal is in the first state;
(ii) an electric motor is outputting positive torque to a powertrain of the vehicle; and
(iii) an accelerator pedal position (APP) is greater than a predetermined APP,
wherein the predetermined APP is at least 50 percent of a predetermined maximum APP;
(iv) a selected gear ratio of a transmission of the vehicle is greater than or equal to a predetermined gear ratio,
wherein the predetermined gear ratio is at least a fifth gear ratio of the transmission; and,
based on the audio characteristics, apply power to speakers to output sound within a passenger cabin of the vehicle.

12. The vehicle audio system of claim 11 wherein the computer executable instructions further cause the at least one processor to set the audio characteristics for the acceleration event based on a present torque output of the electric motor.

13. The vehicle audio system of claim 12 wherein the audio characteristics include a loudness, and wherein the computer readable instructions further cause the at least one processor to:
(i) increase the loudness for the acceleration event as the present torque output of the electric motor increases; and
(ii) decrease the loudness for the acceleration event as the present torque output of the electric motor decreases.

14. The vehicle audio system of claim 11 wherein the computer executable instructions further cause the at least one processor to set the audio characteristics for the acceleration event based on a pseudo engine speed.

15. The vehicle audio system of claim 14 wherein the audio characteristics include a frequency for outputting predetermined sounds, and
wherein the computer executable instructions further cause the at least one processor to:
increase the frequency for the acceleration event as the pseudo engine speed increases; and
decrease the frequency for the acceleration event as the pseudo engine speed decreases.

16. The vehicle audio system of claim 11 wherein the computer executable instructions further cause the at least one processor to:
set second audio characteristics for a regeneration event in response to determinations that both of:
(i) the longitudinal acceleration of the vehicle is negative; and
(ii) the electric motor is converting mechanical energy of the powertrain of the vehicle into electrical energy; and
based on the second audio characteristics, apply power to the speakers to output sound within the passenger cabin of the vehicle.

17. The audio system of claim 16 wherein the second audio characteristics include a loudness, and
wherein the computer executable instructions further cause the at least one processor to set the loudness of sound output for the regeneration event based on at least one of (i) the longitudinal acceleration of the vehicle, (ii) whether the driver is applying pressure to a brake pedal, (iii) whether the driver is actuating a regeneration user input device, and (iv) a negative torque output of the electric motor.

18. A non-transitory computer readable medium comprising computer executable instructions, the computer executable instructions configured to cause a processor to perform a method, the method comprising:
setting an acceleration state signal to a first state when a longitudinal acceleration of a vehicle is greater than a first predetermined acceleration,
wherein the first predetermined acceleration is positive;
setting audio characteristics for an acceleration event in response to determinations that all of:
(i) the acceleration state signal is in the first state;
(ii) an electric motor is outputting positive torque to a powertrain of the vehicle; and
(iii) an accelerator pedal position (APP) is greater than a predetermined APP,
wherein the predetermined APP is at least 50 percent of a predetermined maximum APP;
(iv) a selected gear ratio of a transmission of the vehicle is greater than or equal to a predetermined gear ratio,
wherein the predetermined gear ratio is at least a fifth gear ratio of the transmission; and,
based on the audio characteristics, applying power to speakers to output sound within a passenger cabin of the vehicle.

19. The non-transitory computer readable medium of claim 18, wherein the method further comprises at least one of (A) and (B):
(A) setting the audio characteristics for the acceleration event based on a present torque output of the electric motor including:
(i) increasing a loudness for the acceleration event as the present torque output of the electric motor increases; and
(ii) decreasing the loudness for the acceleration event as the present torque output of the electric motor decreases; and
(B) setting the audio characteristics for the acceleration event based on a pseudo engine speed including:
(i) increasing a frequency for the acceleration event as the pseudo engine speed increases; and
(ii) decreasing the frequency for the acceleration event as the pseudo engine speed decreases.

20. The non-transitory computer readable medium of claim 19, wherein the method further comprises:
setting second audio characteristics for a regeneration event in response to determinations that both of:
(i) the longitudinal acceleration of the vehicle is negative; and
(ii) the electric motor is converting mechanical energy of the powertrain of the vehicle into electrical energy; and
based on the second audio characteristics, applying power to the speakers to output sound within the passenger cabin of the vehicle.

* * * * *